US011836485B1

(12) United States Patent
Cancilla et al.

(10) Patent No.: US 11,836,485 B1
(45) Date of Patent: Dec. 5, 2023

(54) SOFTWARE CODE REVIEW

(71) Applicant: Rapid7, Inc., Boston, MA (US)

(72) Inventors: James Cancilla, Milton (CA); Ian Horbatiuk, Toronto (CA)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 16/543,842

(22) Filed: Aug. 19, 2019

(51) Int. Cl.
*G06F 8/75* (2018.01)
*G06F 8/72* (2018.01)
*G06F 8/73* (2018.01)
*G06F 8/71* (2018.01)

(52) U.S. Cl.
CPC .............. *G06F 8/73* (2013.01); *G06F 8/72* (2013.01); *G06F 8/75* (2013.01); *G06F 8/71* (2013.01)

(58) Field of Classification Search
None
See application file for complete search history.

(56) References Cited

U.S. PATENT DOCUMENTS

| | | | | |
|---|---|---|---|---|
| 6,476,814 B1* | 11/2002 | Garvey | ............... | G06T 11/206 345/440 |
| 8,856,725 B1* | 10/2014 | Anderson | ............... | G06F 8/75 717/103 |
| 10,289,539 B1* | 5/2019 | Arguelles | ............ | G06F 11/3664 |
| 10,545,855 B1* | 1/2020 | Jayaswal | ............... | G06F 11/3672 |
| 10,635,566 B1* | 4/2020 | Talluri | ............... | G06F 11/3404 |
| 10,719,645 B1* | 7/2020 | Zhang | ............... | G06F 11/3608 |
| 10,769,250 B1* | 9/2020 | Tautschnig | ............. | G06F 21/12 |
| 10,810,110 B1* | 10/2020 | Thomas | ............. | G06F 11/3664 |
| 10,824,420 B2* | 11/2020 | Collins | ............. | G06F 8/10 |
| 2003/0084425 A1* | 5/2003 | Glaser | ................ | G06F 8/433 717/110 |
| 2007/0079257 A1* | 4/2007 | Vignet | ............... | G06F 11/366 715/853 |
| 2010/0042974 A1* | 2/2010 | Gutz | ................ | G06F 8/71 717/121 |
| 2010/0122238 A1* | 5/2010 | Kannan | ............... | G06F 8/36 717/123 |
| 2010/0275070 A1* | 10/2010 | Mercer | ............... | G06F 8/51 717/136 |
| 2013/0268916 A1* | 10/2013 | Misra | ............... | G06Q 10/06 717/123 |
| 2014/0189650 A1* | 7/2014 | Gounares | ............ | G06F 11/3636 717/125 |
| 2016/0041824 A1* | 2/2016 | Bostick | ............... | G06F 8/72 717/123 |
| 2016/0062876 A1* | 3/2016 | Narayanan | ........... | G06F 11/3684 717/130 |
| 2016/0117629 A1* | 4/2016 | Collier | ............ | G06Q 10/063114 717/101 |
| 2017/0161176 A1* | 6/2017 | Ferrara | ............... | G06F 11/3604 |

(Continued)

OTHER PUBLICATIONS

"The Java Tutorials, Essential Java Classes, Basic I/O", 1995, retrieved from <https://docs.oracle.com/javase/tutorial/essential/io/formatting.html> on Jan. 28, 2022 (Year: 1995).*

*Primary Examiner* — Jason D Mitchell
(74) *Attorney, Agent, or Firm* — Ashwin Anand

(57) ABSTRACT

Methods and systems for reviewing software code. The methods involve detecting a change in source code associated with an application and determining an effect on the application of the detected change based at least in part on a context profile associated with application.

10 Claims, 3 Drawing Sheets

(56) References Cited

U.S. PATENT DOCUMENTS

| | | | |
|---|---|---|---|
| 2017/0351510 A1* | 12/2017 | Li | G06F 16/148 |
| 2017/0372247 A1* | 12/2017 | Tauber | G06F 8/71 |
| 2018/0260312 A1* | 9/2018 | Strachan | G06F 11/3684 |
| 2018/0293386 A1* | 10/2018 | Barouni Ebrahimi | G06F 21/577 |
| 2018/0307506 A1* | 10/2018 | Rudrappa Goniwada | G06F 8/38 |
| 2018/0364985 A1* | 12/2018 | Liu | G06F 11/3664 |
| 2019/0129701 A1* | 5/2019 | Hawrylo | G06F 8/60 |
| 2019/0163616 A1* | 5/2019 | Govindaraju | G06F 11/3672 |
| 2019/0205106 A1* | 7/2019 | Sharma | G06F 8/427 |
| 2019/0235850 A1* | 8/2019 | Mukherjee | G06F 8/71 |
| 2019/0361686 A1* | 11/2019 | Gnazdowsky | G06F 8/71 |
| 2020/0110996 A1* | 4/2020 | Bhageria | G06F 16/355 |
| 2020/0159934 A1* | 5/2020 | Yamaguchi | G06F 16/9024 |
| 2020/0174907 A1* | 6/2020 | Lundquist | G06F 11/3604 |
| 2020/0192789 A1* | 6/2020 | Peng | G06F 8/77 |
| 2020/0202246 A1* | 6/2020 | Lin | G06F 9/54 |
| 2020/0401386 A1* | 12/2020 | Punathil | G06F 8/433 |
| 2020/0401503 A1* | 12/2020 | Gao | G06F 11/3672 |
| 2022/0156063 A1* | 5/2022 | Tamir | G06F 8/60 |

* cited by examiner

SOFTWARE CODE REVIEW

TECHNICAL FIELD

Embodiments described herein relate to methods and systems for reviewing software code and, more particularly but not exclusively, to methods and systems for recognizing the effect of changes to software code.

BACKGROUND

When software developers want to edit an application, their changes are typically communicated to a source control repository. This source control repository provides a means for performing a code review by displaying a file-level comparison of the changes.

This comparison may be useful in understanding changes made to a specific file. However, this type of comparison does not provide any insight into how the changes affect the application as a whole. Accordingly, changes made by a developer may appear benign, but may actually result in significant and unexpected changes to the application, unbeknownst to the developer and others.

A need exists, therefore, for more effective systems and methods for reviewing software code.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of reviewing software code. The method includes receiving, at an interface, a context profile associated with an application; detecting, using a processor executing instructions stored on memory, a change in source code associated with the application; determining, using the processor, an effect on the application of the detected change based at least in part on the context profile associated with application; and providing, using the processor, a report of the effect of the detected change.

In some embodiments, the method further includes identifying, using the processor, at least one code path associated with the application using the source code associated with the application, wherein the effect of the detected change is based on the at least one code path. In some embodiments, the method further includes comparing, using the processor, the at least one code path with the detected change to identify an area of the application that will be modified based on the detected change.

In some embodiments, the method further includes determining, using the processor, the context profile associated with the application. In some embodiments, determining the context profile associated with the application includes identifying annotations associated with the source code associated with the application.

In some embodiments, the context is defined by at least one of an input to the application and an output from the application.

In some embodiments, determining the effect on the application of the detected change comprises performing a static analysis on the changed source code and referencing the results of the static analysis to the context profile to identify the effect.

In some embodiments, the context profile comprises at least one of an application type and language.

In some embodiments, the method further includes receiving, using the interface, an approval or rejection of the detected change. In some embodiments, the summary of the effect of the detected change is provided in at least substantially real time.

According to another aspect, embodiments relate to a system for reviewing software code. The system includes an interface for at least receiving a context profile associated with an application, and a processor executing instructions stored on memory and configured to detect a change in source code associated with the application, determine an effect on the application of the detected change based at least in part on the context profile associated with application, and provide a report of the effect of the detected change.

In some embodiments, the processor is further configured to identify at least one code path associated with the application using the source code associated with the application, wherein the effect of the detected change is based on the at least one code path. In some embodiments, the processor is further configured to compare the at least one code path with the detected change to identify an area of the application that will be modified based on the detected change.

In some embodiments, the processor determines the context profile associated with the application. In some embodiments, the processor determines the context profile associated with the application by identifying annotations associated with the source code associated with the application.

In some embodiments, the context is defined by at least one of an input to the application and an output from the application.

In some embodiments, the processor determines the effect on the application of the detected change by performing a static analysis on the changed source code and referencing the results of the static analysis to the context profile to identify the effect.

In some embodiments, the context profile comprises at least one of an application type and language.

In some embodiments, the interface is further configured to receive an approval or rejection of the detected change. In some embodiments, the processor provides the summary of the effect of the detected change in at least substantially real time.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
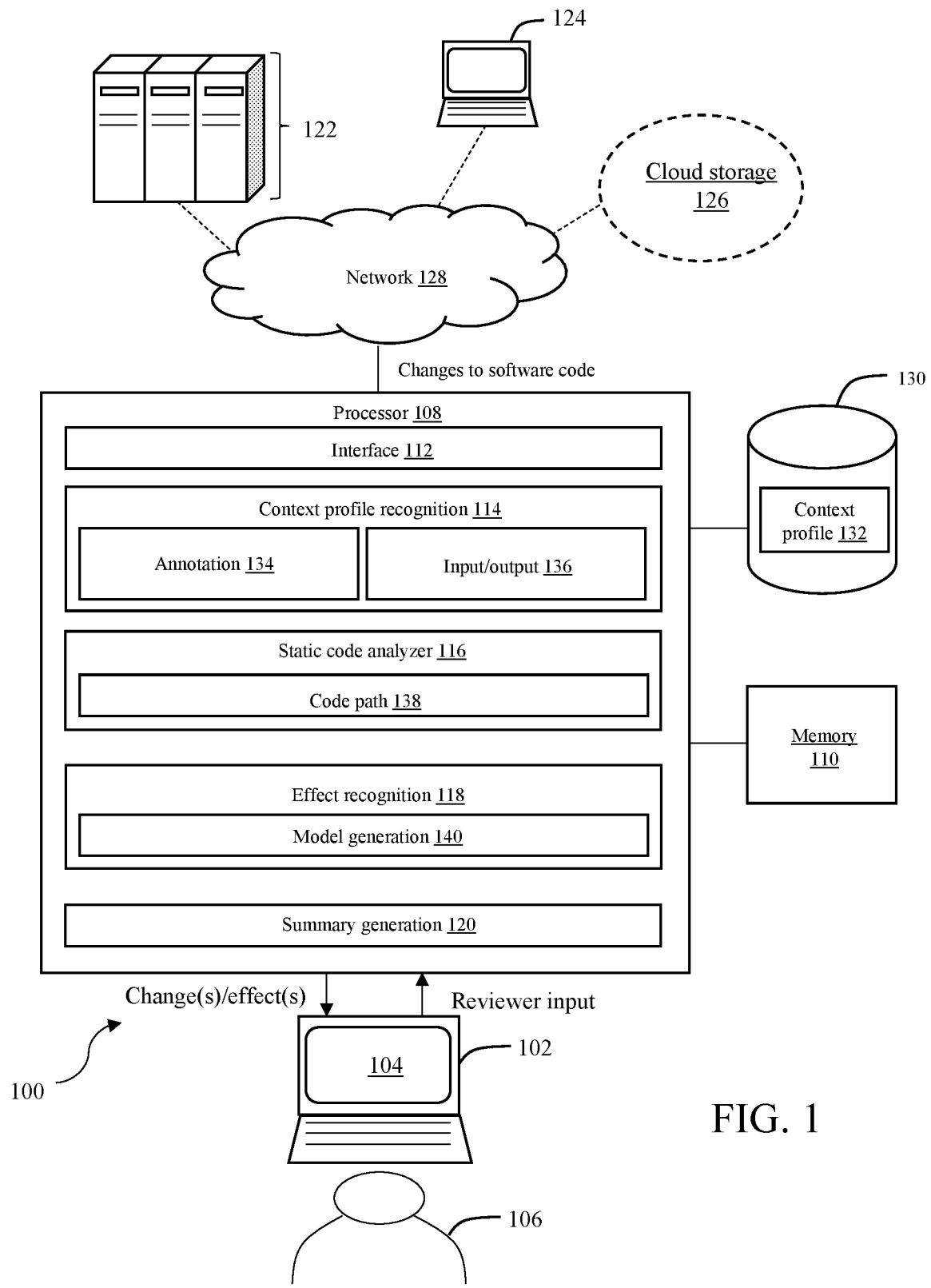
FIG. 1 illustrates a system for reviewing software code in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on nontransient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Developers often make changes to software code associated with an application. While these developers may have an idea of how their changes will affect the application, they may be unaware that some change(s) will have unintended or unknown effects on the application.

Similarly, certain individuals may be tasked with reviewing changes that other team members have made to an application's underlying software code (i.e., source code). These reviewers may similarly be uncertain as to what has changed and the ultimate effect of the change(s) on the application.

Some changes to an application's source code may be benign or ultimately not affect the application in any significant way. If a developer merely changes a variable name, for example, this change would likely not be of interest to a reviewer as it would likely not affect the application.

On the other hand, some changes may significantly impact an application. A change to a response to an HTTP endpoint, for example, may not be easily detected but may affect the application's execution.

As described above, existing techniques for reviewing changes to software code generally involve a source control repository providing a file-level comparison of the changes. While these techniques may be useful for understanding changes to a specific component or file, they do not provide any useful insight regarding how the changes will affect the application as a whole.

The systems and methods described herein achieve novel, intelligent, application-level reviews to changes made to an underlying code base. The systems and methods herein accomplish this at least in part by understanding a context profile associated with the application (e.g., the type of application being reviewed). Based on the context profile, the systems and methods herein may understand the inputs and outputs of the application. The systems and methods described herein may also rely on static code analyses to determine how code-level changes will affect at least those inputs and outputs.

Accordingly, users such as developers or reviewers will have more insight and context regarding how software changes will affect the application. For example, during a review of changes, the systems and methods may inform the reviewer about what areas of the application will be affected and how. This data may be presented to a developer in at least substantially real time or to a reviewer after a developer has submitted their changes for review.

FIG. 1 illustrates a system 100 for reviewing software code in accordance with one embodiment. The system 100 may include a user device 102 executing a user interface 104 for presentation to one or more reviewers 106 such as a software developer or a designated reviewer.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the reviewer 106. The user interface 104 may allow the reviewer 106 to specify and view certain files for analysis.

The reviewer 106 may be a software developer making changes to an application's underlying software. In these instances, the systems and methods may provide the developer with data regarding the changes and their effects in at least substantially real time.

In other instances, the reviewer 106 may be an individual specifically tasked with reviewing the code. In these instances, the reviewer may not be the one who made the changes, but is instead tasked with reviewing code edited by others.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a context profile recognition module 114, a static code analyzer 116, an effect recognition module 118, and a summary generation module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for reviewing software code can be executed by the processor 108 to accomplish the objectives of various embodiments described herein.

The interface 112 may be in communication with one or more network assets such as servers 122, computing devices 124, and server-less cloud storages 126 over one or more networks 128. The network assets 122, 124, and 126 may communicate data regarding software code and changes thereto to the processor 108.

The network(s) 128 may link the various assets and components with various types of network connections. The network(s) 128 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 128 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The processor 108 may receive software code regarding an application and data regarding changes to the software code at the interface 112. The received data may also include a label or some other type of indicia specifying a context profile associated with the application.

For example, a software developer using a computing device 124 such as a laptop may provide some label that informs the processor 108 that the application under review is a Java application. In other embodiments, the context profile recognition module 114 may analyze the received software code and determine the context profile thereof. In these embodiments, the context profile recognition module 114 may rely on data stored in one or more databases 130 to determine the context profile associated with the received software code.

For example, the database(s) 130 may contain context profile data 132 regarding known profiles. Accordingly, the context profile recognition module 114 may compare the received software code with the context profile data 132 to determine which known applications are built with software code that is most similar to the received software code.

The context profile recognition module 114 may include or otherwise execute one or more of an annotation module 134 and an input/output module 136. The annotation module 134 may execute instructions stored in the memory 110 to identify and recognize the significance of any annotations accompanying the received software code.

For example, received software code may be in the form of:

```
    . . .
{
    "applicationType": "Spring Boot Web Application",
    "language": "Java",
    "applicationEntryPoints": [
        {
            "class": "sample.Main"
```

-continued

```
    }
...
```

The context profile recognition module 114 may first recognize that this software code is for a web application using the Spring Model-View-Controller (MVC) framework. The annotation module 134 may then recognize that this type of application is associated with @Controller annotations, which identify the inputs and outputs (endpoints) of the application.

As another example, software code received at the interface 112 may be in the form of:

```
...
{
"applicationType": "Java Application",
"language": "Java"
"applicationEntryPoints": [
{
    "class": "sample.SqsMessageReceiver",
    "method": "handleMessages( )"
},
"applicationExitPoints": [
"class": "sample.DBRepository",
"method": "storeData( )"
    ]
  ]
}
...
```

The context profile recognition module 114 may recognize this software code is for a Java application. The input/output module 136 may then understand that the application's primary entry point is the 'handleMessages( )' method in the 'sample.SQSMessageReceiver' class.

As another example, software code received by the interface 112 may be in the form of:

```
...
{
"applicationType": "AWS Lambda",
"language": "Python"
}
...
```

This exemplary embodiment illustrates the case in which a profile is constructed for serverless functions (e.g., such as those associated with Amazon Web Services (AWS) Lambda). In this case, the inputs to this type of function may already be defined.

The effect recognition module 118 may analyze changes to software code and determine their effects based on the context profile. For example, the effect recognition module 118 may, based on the recognized context profile, at the very least know which inputs or outputs are important. Changes to these inputs or outputs may therefore have an effect on the operation of the application.

Referring back to FIG. 1, the static code analyzer 116 may work in conjunction with the context profile recognition module 114 and may analyze existing static code. Specifically, the code path module 138 may identify one or more code paths associated with the application. In the context of the present application, "code path" may refer to a series of instructions that are executed during the execution of an application or a portion thereof.

The static code analyzer 116 may implement any type of static code analysis tool(s) whether available now or invented hereafter to identify code paths. Based on the identified code paths, the model generation module 140 may then build a model of the application. Once a model has been generated, the proposed changes can be referenced to the model and the affected locations can be identified and reported. The model may be built using any appropriate techniques, such as machine learning, to understand the application.

A generated model may include trees linking classes of the application's software code. For example, these trees may recognize the dependencies between portions of the application and the code path thereof. Accordingly, the effect recognition module 118 may recognize that if a change is made to an "upstream" class, classes downstream from this class may be affected as well.

Figure 2A:
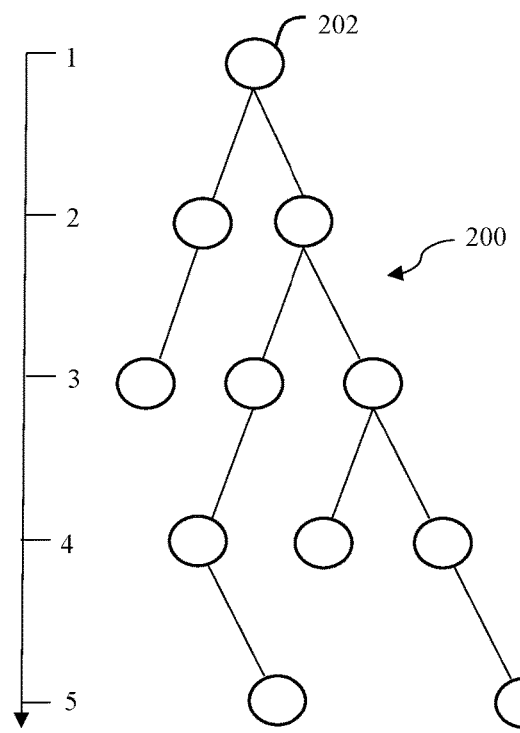
FIGS. 2A-C illustrate exemplary trees representing a code path in accordance with one embodiment.

FIG. 2A illustrates an exemplary tree 200 representing a plurality of code paths associated with an application. The tree 200 may include a plurality of connected nodes 202 that represent different portions and layers of the code path. For example, FIG. 2A also shows an arrow with labels indicating different levels of the tree. The arrow is pointed downwards, indicating that level 5 is downstream from level 4, which is downstream from level 3, and so on.

Figure 2B:
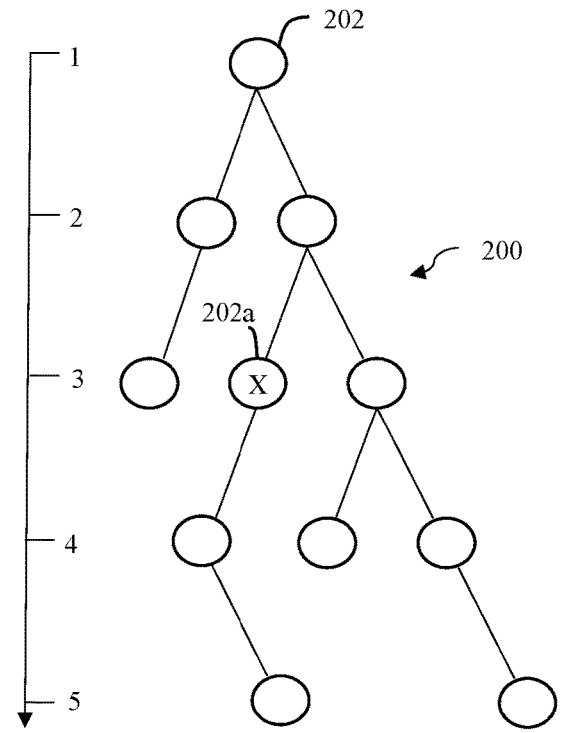

If a change is made to a portion of software code represented by a node, then it is possible if not very likely that all nodes downstream in the same code path will be affected. For example, FIG. 2B illustrates that node 202a has been changed (indicated by "X").

Figure 2C:
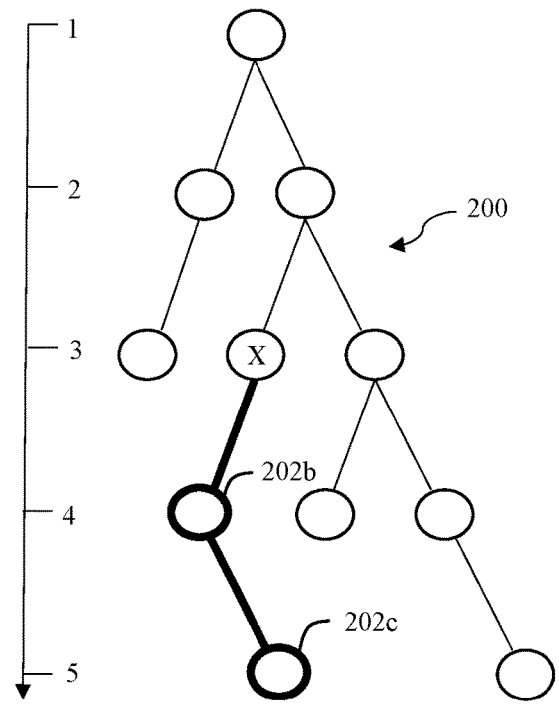

All nodes downstream from node 202a and in the same code path may be affected by the change X. For example, FIG. 2C illustrates that nodes 202b and 202c have been darkened, indicating that these portions of the code path will also be changed. These may include either intentional changes or unintentional changes.

The summary generation module 120 may provide a summary regarding the affected portions of the software code to the reviewer 106 via the user interface 104. The summary may be presented in the form of an illustrative tree such as the tree 200 of FIGS. 2A-C, or simply with text indicating the portions or locations of the software code that will be affected by the change. The reviewer 106 may then be inclined to inspect the other portions of the software code and make any modifications, if necessary. The reviewer may also have the option to accept or reject the changes.

Figure 3:
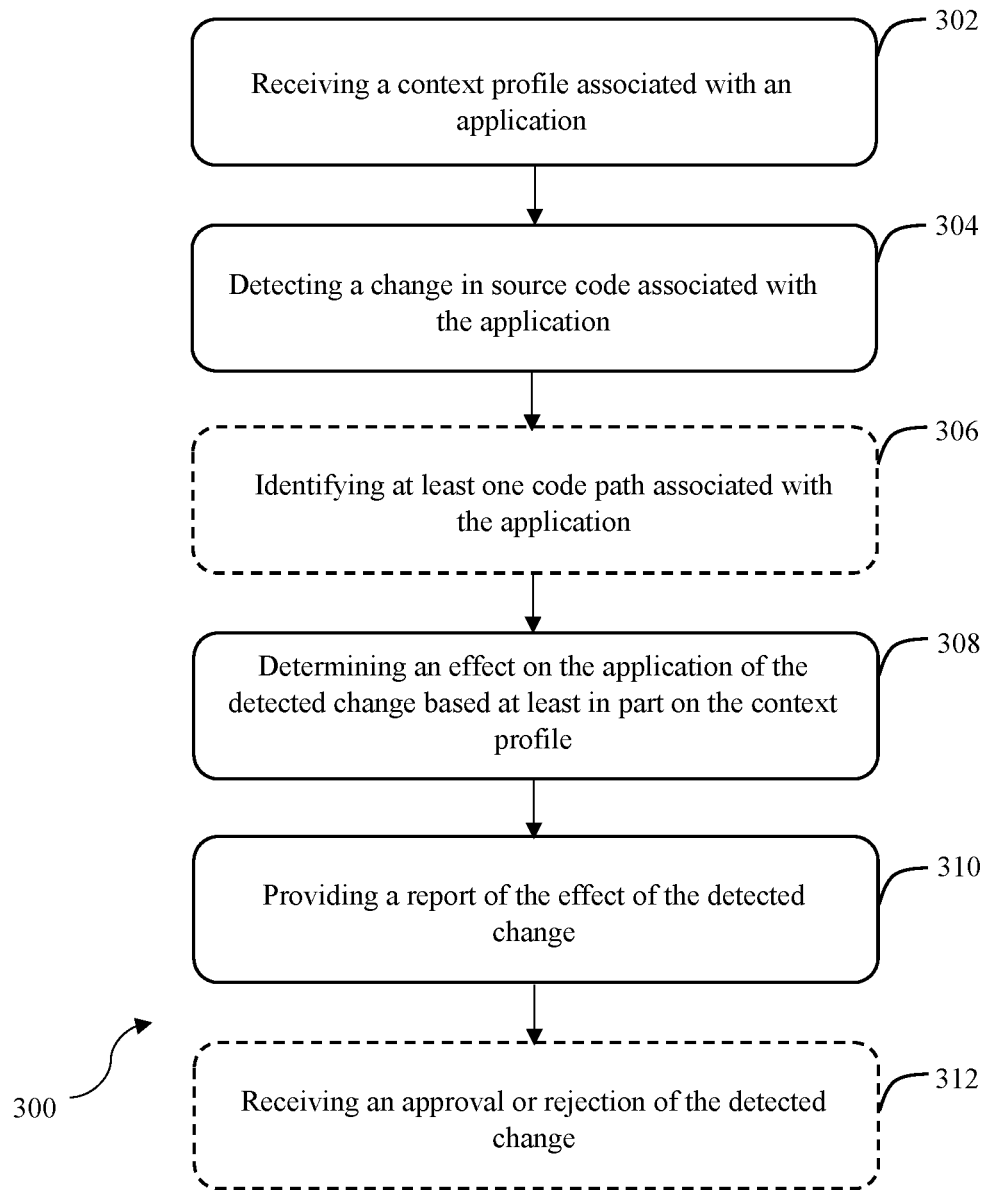
FIG. 3 depicts a flowchart of a method of reviewing software code in accordance with one embodiment.

FIG. 3 depicts a flowchart of a method 300 for reviewing software code in accordance with one embodiment. The system 100 of FIG. 1 (or the components thereof) may perform the steps of method 300.

Step 302 involves receiving, at an interface, a context profile associated with an application. For example, an application may have been previously tagged or otherwise labeled with a context profile that indicates its context (e.g., the type of application). In some embodiments, a processor such as the processor 108 of FIG. 1 may determine the context profile associated with the application. The context profile may comprise at least one of an application type and language, for example.

The application may be received from one or more network assets such as those discussed previously. For example, a reviewer may wish to review source code that has been modified by a fellow team member. In some embodiments, method 300 may be executed in at least substantially real time as a developer is editing source code.

Step 304 involves detecting, using a processor executing instructions stored on memory, a change in source code associated with the application. This change may be detected in at least substantially real time as a developer is editing the source code, or at some later time such as if a designated reviewer is reviewing changes made by a developer.

Step 306 involves identifying, using the processor, at least one code path associated with the application using the source code associated with the application. The identified code path(s) may relate to a series of instructions performed during execution of an application or a portion thereof. These code paths, such as those shown in FIGS. 2A-C, may identify dependency relationships between different components of the application's source code. Accordingly, a change to one location of the source could may affect one or more downstream locations of the source code.

Step 308 involves determining, using the processor, an effect on the application of the detected change based at least in part on the context profile associated with application. In some embodiments, an effect recognition module such as the effect recognition module 118 of FIG. 1 may recognize how a particular change to source code will affect the application.

For example, based on the context profile of the application, the effect recognition module may identify which endpoints of an application are at risk of being affected by a change in the source code. Similarly, the processor may compare the code path(s) with the detected change to identify an area of the application that will be modified. This step may involve performing a static analysis on the changed source code and referencing the results of the static analysis to the context profile to identify the effect.

Step 310 involves providing, using the processor, a report of the effect of the detected change. More specifically, a summary generation module such as the summary generation module 120 of FIG. 1 may organize data related to the determined effects and provide a summary thereof to a reviewer. The summary may be presented as text, images of portions of software code affected, illustrations such as those of FIGS. 2A-C, or in any other suitable format. A user such as a reviewer may then inspect the source code and make any additional revisions as appropriate.

Step 312 involves receiving, using the interface, an approval or rejection of the detected change. A reviewer may be presented with an option to accept or reject the change to the source code (and therefore the resultant change(s) to the rest of the application). The reviewer may similarly review the effect(s) on the application, and supply instructions regarding whether they accept or reject the changes via a user interface such as the user interface 104 of FIG. 1.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
    performing, by a software reviewing system implemented by one or more processors of one or more computing devices:
        identifying one or more code paths associated with an application, wherein the identifying comprises performing a static code analysis on source code associated with the application;
        building, based at least in part on the one or more code paths, a model of the application, wherein the model comprises one or more trees linking different portions of the source code associated with the application;
        receiving, over a network, changed source code comprising a change in the source code for the application;
        in at least substantially real time with the receiving the changed source code:

recognizing, based on the changed source code, a particular pre-existing context profile for the application from among a plurality of pre-existing context profiles of other known applications stored in a database based on a comparison of the change source code and code of another known application, wherein the particular pre-existing context profile indicates an application type, an application language, and a programming framework of the application, determining, at least partly by referencing the changed source code to the model of the application, an effect of the changed source code on the application, wherein the determining the effect comprises:

performing a second static code analysis on the changed source code, generating, based on the second static code analysis of the changed source code and the particular pre-existing context profile, a tree of linked nodes of the application, wherein the tree includes at least one code path of a plurality of nodes, identifying, from among the plurality of nodes, a first node on the at least one code path that corresponds to the change in the source code, and at least one node downstream from the first node, determining, based on the identified first node of the at least one code path that corresponds to the change in the source code and the at least one downstream node of the at least one code path, a portion of the application affected by the change in the source code, and determining, based on referencing the affected portion of the application to one or more entry points and exit points of the application, at least one exit point of the application affected by the change in the source code, and generating, via a user interface, a summary of the effect of the changed source code on the application, wherein the summary indicates the tree of linked nodes, the first node that corresponds to the change in the source code, a portion of the at least one code path affected by the change, and the at least one exit point affected by the change in the source code; and receiving user input via the user interface indicating approval or rejection of the change in the source code.

2. The method of claim 1 wherein determining the particular pre-existing context profile associated with the application includes identifying annotations in the changed source code specific to the programming framework of the application.

3. The method of claim 1, wherein the application language is Java and the programming framework is a Model-View-Controller (MVC) web application framework.

4. The method of claim 1, wherein individual nodes in the tree correspond to individual software classes defined by the source code.

5. A system comprising:

a software reviewing system implemented by one or more processors and a coupled memory, configured to:

identify one or more code paths associated with an application, wherein, to identify the one or more code paths based on a static code analysis on source code associated with the application;

build, based at least in part on the one or more code paths, a model of the application, wherein the model comprises one or more trees linking different portions of the source code associated with the application;

receive, over a network, changed source code comprising a change in the source code for the application;

in at least substantially real time with the changed source code being received:

recognize, based on the changed source code, a particular pre-existing context profile for the application from among a plurality of pre-existing context profiles of other known applications stored in a database based on a comparison of the change source code and code of another known application, wherein the particular pre-existing context profile indicates an application type, an application language, and a programming framework of the application, determine, at least partly by referencing the changed source code to the model of the application, an effect of the changed source code on the application, wherein to determine the effect, the one or more processors are configured to:

perform a second static code analysis on the changed source code, generate, based on the second static code analysis of the changed source code and the particular pre-existing context profile, a tree of linked nodes of the application, wherein the tree includes at least one code path of a plurality of nodes, identify, from among the plurality of nodes, a first node on the at least one code path that corresponds to the change in the source code, and at least one node downstream from the first node, determine, based on the identified first node of the at least one code path that corresponds to the change in the source code and the at least one downstream node of the at least one code path, a portion of the application affected by the change in the source code, determine, based on referencing the affected portion of the application to the one or more entry points and exit points of the application, at least one exit point of the application affected by the change in the source code, and generate, via a user interface, a summary of the effect of the changed source code on the application, wherein the summary indicates the tree of linked nodes, the first node that corresponds to the change in the source code, a portion of the at least one code path affected by the change, and identifies the at least one exit point affected by the change in the source code; and receive user input via the user interface indicating approval or rejection of the change in the source code.

6. The system of claim 5, wherein the software reviewing system identifies annotations in the changed source code specific to the programming framework of the application.

7. The system of claim 5, wherein the application language is Java and the programming framework is a Model-View-Controller (MVC) web application framework.

8. The system of claim 5, wherein the summary indicates multiple software levels or layers of the application and associates individual nodes in the tree to individual ones of the software levels or layers.

9. The system of claim 5, wherein
the change in the source code for the application is received in response to submission of the changed source code to a source control repository, and
the user interface permits inspection and modification of the source code based on the summary.

10. The system of claim 5, wherein the particular pre-existing context profile indicates that the source code includes one or more serverless functions executable on a serverless execution service.

\* \* \* \* \*